(12) United States Patent
Aiello

(10) Patent No.: US 7,004,634 B2
(45) Date of Patent: Feb. 28, 2006

(54) FLUID DYNAMIC BEARING ASYMMETRY PRESSURE FEEDBACK

(75) Inventor: Anthony Joseph Aiello, Aptos, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/602,422

(22) Filed: Jun. 23, 2003

(65) Prior Publication Data

US 2005/0259897 A1 Nov. 24, 2005

Related U.S. Application Data

(60) Provisional application No. 60/390,340, filed on Jun. 21, 2002.

(51) Int. Cl.
*F16C 17/10* (2006.01)
(52) U.S. Cl. ...................... 384/112; 384/107
(58) Field of Classification Search ........... 384/107, 384/113, 115, 119, 120, 114
See application file for complete search history.

(56) References Cited

U.S. PATENT DOCUMENTS

| | | | | |
|---|---|---|---|---|
| 5,046,863 A | * | 9/1991 | Sakatani et al. | ........... 384/101 |
| 5,283,491 A | | 2/1994 | Jabbar et al. | |
| 5,370,463 A | * | 12/1994 | Asada et al. | ............ 384/113 |
| 5,559,382 A | | 9/1996 | Oku et al. | |
| 5,806,987 A | | 9/1998 | Gomyo et al. | |
| 5,855,438 A | | 1/1999 | Lee | |
| 6,066,903 A | | 5/2000 | Ichiyama | |
| 6,149,161 A | | 11/2000 | Grantz et al. | |
| 2001/0014188 A1 | | 8/2001 | Sakuragi et al. | |
| 2002/0067089 A1 | | 6/2002 | Ichiyama | |
| 2003/0185473 A1 | * | 10/2003 | Gomyo et al. | ............ 384/107 |
| 2004/0028298 A1 | * | 2/2004 | Sakatani et al. | ............ 384/107 |

* cited by examiner

*Primary Examiner*—Lenard A. Footland
(74) *Attorney, Agent, or Firm*—Morrison & Foerster LLP

(57) ABSTRACT

The present invention relates to the field of fluid dynamic bearings. Specifically, the present invention provides an apparatus and method useful for maintaining axial movement of a rotor in a high speed spindle motor assembly.

19 Claims, 6 Drawing Sheets

FLUID DYNAMIC BEARING ASYMMETRY PRESSURE FEEDBACK

CROSS REFERENCE TO A RELATED APPLICATION

This application claims priority to provisional application Ser. No. 60/390,340, filed Jun. 21, 2002, entitled "Fluid Dynamic Bearing Asymmetry Pressure Feedback Groove" invented by Anthony Aiello, and incorporated herein by reference.

FIELD OF THE INVENTION

The present invention relates to the field of computer disk drives, specifically, those having fluid dynamic bearings.

BACKGROUND OF THE INVENTION

Disk drive memory systems have been used in computers for many years for the storage of digital information. Information is recorded on concentric tracks of a magnetic disk medium, the actual information being stored in the forward magnetic transitions within the medium. The disks themselves are rotatably mounted on a spindle. Information is accessed by a read/write transducer located on a pivoting arm that moves radially over the surface of the rotating disk. The read/write heads or transducers must be accurately aligned with the storage tracks on the disk to ensure proper reading and writing of information.

During operation, the disks are rotated at very high speeds within an enclosed housing using an electric motor generally located inside a hub or below the disks. Such spindle motors may have a spindle mounted by two ball bearing systems to a motor shaft disposed in the center of the hub. The bearing systems are spaced apart, with one located near the top of the spindle and the other spaced a distance away. These bearings allow support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one condition that virtually guarantees physical contact between raceways and balls, in spite of the lubrication provided by the bearing oil or grease. Bearing balls running on the microscopically uneven and rough raceways transmit the vibration induced by the rough surface structure to the rotating disk. This vibration results in misalignment between the data tracks and the read/write transducer, limiting the data track density and the overall performance of the disk drive system. Further, mechanical bearings are not always scalable to smaller dimensions. This is a significant drawback, since the tendency in the disk drive industry has been to shrink the physical dimensions of the disk drive unit.

As an alternative to conventional ball bearing spindle systems, much effort has been focused on developing a fluid dynamic bearing. In these types of systems, lubricating fluid, either gas or liquid, functions as the actual bearing surface between a shaft and a sleeve or hub. Liquid lubricants comprising oil, more complex fluids, or other lubricants have been utilized in such fluid dynamic bearings.

The reason for the popularity of the use of such fluids is the elimination of the vibrations caused by mechanical contact in a ball bearing system and the ability to scale the fluid dynamic bearing to smaller and smaller sizes. In designs such as the single plate fluid dynamic bearing, two thrust surfaces generally are used to maintain the axial position of the spindle/shaft assembly in relation to other components such as the sleeve. Maintaining proper axial alignment is essential to maintaining alignment between the data tracks and the transducer and the retaining the overall performance of the disk drive system.

In addition, in fluid dynamic bearing designs the change of viscosity of the bearing fluid with changing operating temperature of the bearing and/or motor imposes a significant restraint. Another approach to assure axial position of the spindle/motor shaft assembly and to address the varying viscosity of the fluid is to remove one of the thrust surfaces from the fluid dynamic bearing and replace it with a magnetic force to constrain the motor's axial movement. This typically involves adding a magnetic circuit to the assembly consisting of a magnet fixed to the hub, sleeve or base that attracts (or repels) the facing motor hub, sleeve or base, or, alternatively, offsetting the stator magnet from the stator. Though effective, such magnetic configurations require additional parts, machining or alternative assembly.

Thus, there clearly is an interest in the art to provide fluid dynamic bearing designs that assure proper axial positioning of the spindle/shaft assembly.

SUMMARY OF THE INVENTION

In the field of fluid dynamic bearing motors for use in hard disk drives, some prior art systems, including but not limited to rotor designs using a single fluid dynamic thrust bearing in conjunction with a constant axial-biasing force, are highly sensitive to fly height (operating thrust gap) changes caused by journal asymmetry pressure variation. Also, traditional single plate fluid dynamic bearing designs and single open-ended fluid dynamic bearing designs that lack pressure equalization ports between the grooved bearing regions are sensitive to pressure variation caused by part tolerances. Part tolerances can lead to localized sub-ambient pressure regions, air formation in the lubricant, and large fly height variation.

The present invention provides a spindle/shaft (rotor) assembly with constrained axial movement. In a fluid dynamic bearing design comprising a shaft and a thrust plate at or near the end of the shaft, asymmetry is established along the journal bearing(s) to produce a pressure gradient directed toward the thrust bearing. Journal bearing asymmetry produces a hydraulic force to the bottom end of the shaft, producing an upward lift. Typically, in a single thrust fluid dynamic bearing, the upward lift is countered by a downward force provided by a magnetic bias. The present invention, however, further prevents axial displacement and fly height variation by introducing a feedback system that adjusts journal asymmetry pressure during axial movement of the rotor. These and other advantages and objectives are achieved by providing a fluid bearing design between a shaft and a sleeve where a fluid bearing supports the shaft for rotation, with shaft/sleeve positioning being regulated axially by a regulating region on the structure opposite the structure having the bearing grooves.

In a first exemplary embodiment, the shaft is supported for rotation by a bearing rotating within a sleeve. To prevent axial movement of the shaft due to upward or downward forces while spinning, a regulating region (a region having one or more steps, indentations, grooves or other like structures) is located on the surface of the shaft when the bearing grooves are located on the sleeve, or, conversely, the regulating region is located on the sleeve if the bearing grooves are located on the shaft. Note that the common factor to the forms that the region may take—be it step, groove or indentation—is that the radial distance between the shaft and the sleeve, known as the bearing gap, is altered. The distance is decreased in the case of a regulating region "step", and is increased in the case of a regulating region "groove" or "indentation."

Thus, the present invention provides a fluid dynamic bearing assembly that provides improved axial alignment comprising a sleeve having at least one set of asymmetric bearing grooves thereon and a shaft adjacent the sleeve and having a regulating region. When the shaft and the sleeve are in proper axial alignment, the regulating region and the asymmetric bearing grooves have a nominal net asymmetry pressure optimized for rotation of the rotor during operation of the disk drive. When the shaft and the sleeve move relative to one another, the regulating region and the asymmetric bearing grooves vary from nominal net asymmetry length, and subsequently, pressure. Once this variation occurs, forces caused by the change in asymmetry pressure and the magnetic bias force or opposing thrust bearing act to restore proper axial position of the spindle/shaft (rotor) assembly through feedback imposed by the configuration of the fluid dynamic bearing and regulatory region.

BRIEF DESCRIPTION OF THE DRAWINGS

For a fuller understanding of the present invention, reference is made to the accompanying drawings in the following detailed description.

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disk drive which is illustrated. On the contrary, the invention is intended to cover alternatives, modifications and equivalents that may be included within the spirit and scope of the invention as defined by the attached claims. Further, both hard disk drives and spindle motors are both well known to those of skill in this field. In order to avoid confusion while enabling those skilled in the art to practice the claimed invention, this specification omits such details with respect to known items.

The embodiments of the present invention are intended to maintain axial positioning of the spindle/shaft assembly. The problem is complicated by the fact that the relative rotation of the spindle/shaft is typically supported by fluid whose viscosity changes with temperature. Moreover, the power consumption also changes with the change in viscosity of the fluid. At low temperature the viscosity is high and the power consumption is also relatively high. The power consumption and stiffness change with the width of the gap in which the bearing is established. In typical designs, the gap is constant, and therefore the power consumption and stiffness vary as the viscosity of the fluid changes. In addition, axial positioning of the spindle assembly must be maintained to reduce power variation and maintain fidelity of the system.

Figure 1:
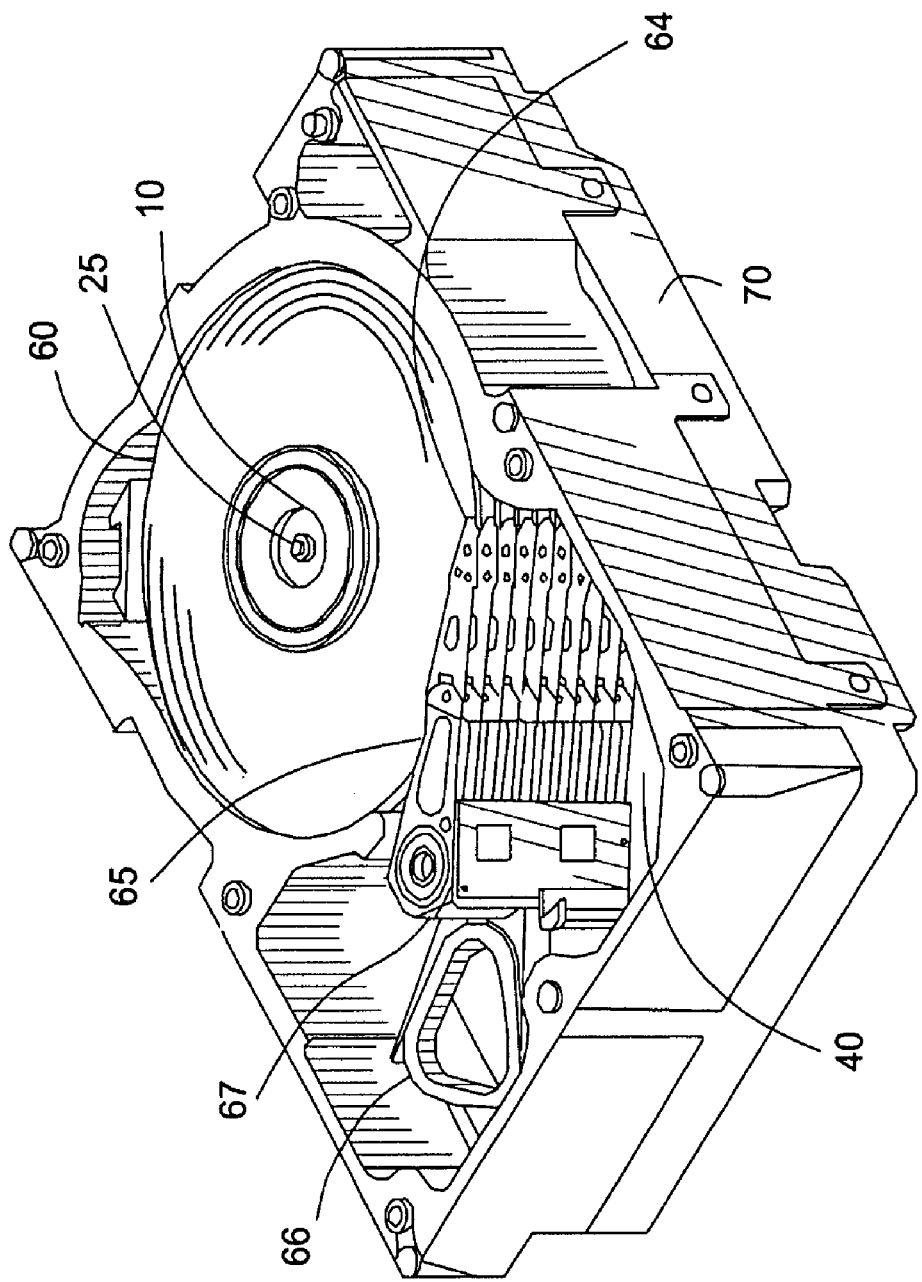
FIG. 1 illustrates an example of a magnetic disk drive in which the invention may be employed.

FIG. 1 illustrates an example of a magnetic disk drive in which the invention may be employed. At least one magnetic disk 60 having a plurality of concentric tracks for recording information is mounted on a spindle 10. The spindle is mounted on spindle support shaft 25 for rotation about a central axis. As the disks are rotated by the motor, a transducer 64 mounted on the end of an actuator end 65 is selectively positioned by a voice coil motor 66 rotating about a pivot axis 67 to move the transducer 64 from track to track across the surface of the disk 60. The elements of the disk drive are mounted on base 40 in a housing 70 that is typically sealed to prevent contamination (a top or cover of housing 70 is not shown). The disks 60 are mounted on spindle 10.

Figure 2:
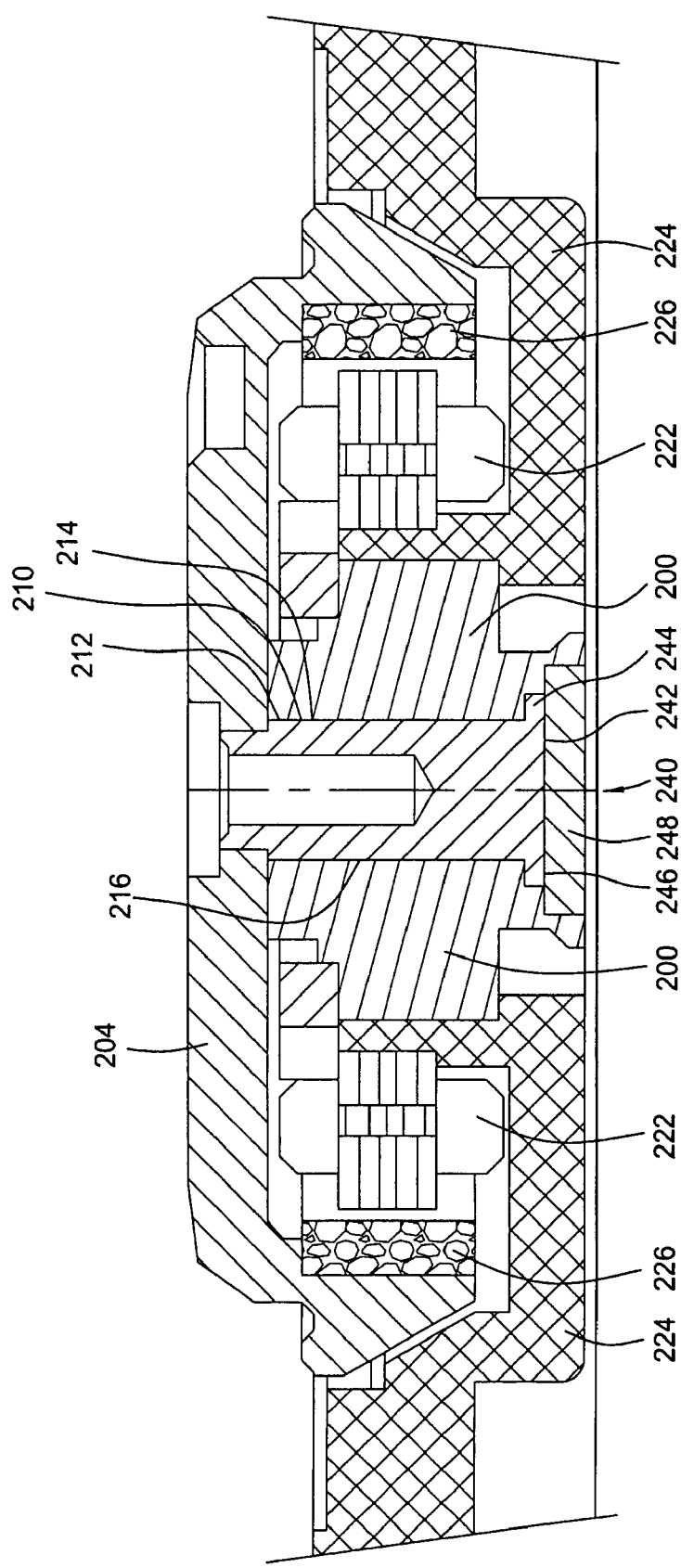
FIG. 2 is a vertical sectional view of a prior art single thrust, single open-ended magnetic preload fluid dynamic bearing motor.

FIG. 2 shows a prior art fluid bearing comprising a sleeve 200 and a shaft 202 supporting a hub 204 for rotation. The hub supports one or more disks (not shown). The design includes a fluid dynamic bearing 210 comprising a gap between the outer surface 212 of shaft 202 and the inner surface 214 of sleeve 200. One of those two surfaces has grooves to maintain the pressure of a fluid 216 maintained in this gap to support the relative rotation of the shaft and sleeve. Grooves can be of any type known in the art, including those of chevron, herringbone, spiral, or sinusoidal configuration. In addition, there is an additional fluid in gap 242 between the bottom 244 of the shaft 202, and the top 246 of counter plate 248.

The design shown includes a stator 222 supported on the outer surface of the base 224, and cooperating with magnet 226 so that appropriate energization of the stator causes high speed rotation of the hub 204 and, accordingly, the disks.

The directional force of the thrust and hydrodraulic bearing acting on the rotor when in operation is shown at 240. Spinning of the shaft with the fluid dynamic bearings 210 generates a journal asymmetry pressure that acts on the shaft to assist in rotor lift.

FIGS. 3–6 are three exemplary embodiments of the present invention. In all embodiments, placing a regulatory region in specific locations along the shaft surface allows one to introduce regions where the effects of asymmetry pressure variation causes pressure feedback such that proper axial alignment is restored. When the rotor displaces axially (the sleeve and shaft move relative to one another), the regulatory region moves relative to the asymmetric journal groove pattern, causing slight changes to the effective bearing groove lengths. These length changes vary the bearing asymmetry length from nominal asymmetry. If the circumferential regulatory region is located properly, upward movement of the rotor will decrease the pressure acting on the end surface of the shaft, thereby reducing the lift of the rotor. In the case where the rotor displaces downward, the opposite occurs, thus creating a novel axial displacement feedback system.

In single open-ended fluid dynamic bearing motors, asymmetry pressure is generated to prevent sub-ambient pressure and subsequent bubble formation due to part tolerances. When part tolerances reverse the groove pumping direction and sub-ambient pressure begins to form, the rotor displaces downward due to reduced pressure acting on the shaft end. However, this downward displacement increases journal bearing asymmetry and the system acts to return the sleeve/shaft to its previous axial position.

In single thrust-bearing fluid dynamic bearing motors in which the counter thrust is provided by a constant bias force, thrust bearing stiffness is highly sensitive to fly height (operating thrust bearing gap). When the fly height increases due to journal asymmetry pressure acting on the end of the shaft, the feedback system of the present invention serves to counteract that pressure by returning the rotor to a lower fly height, and vice versa. This reduces overall fly height variation and subsequent stiffness and bearing drag variation.

Figure 3:
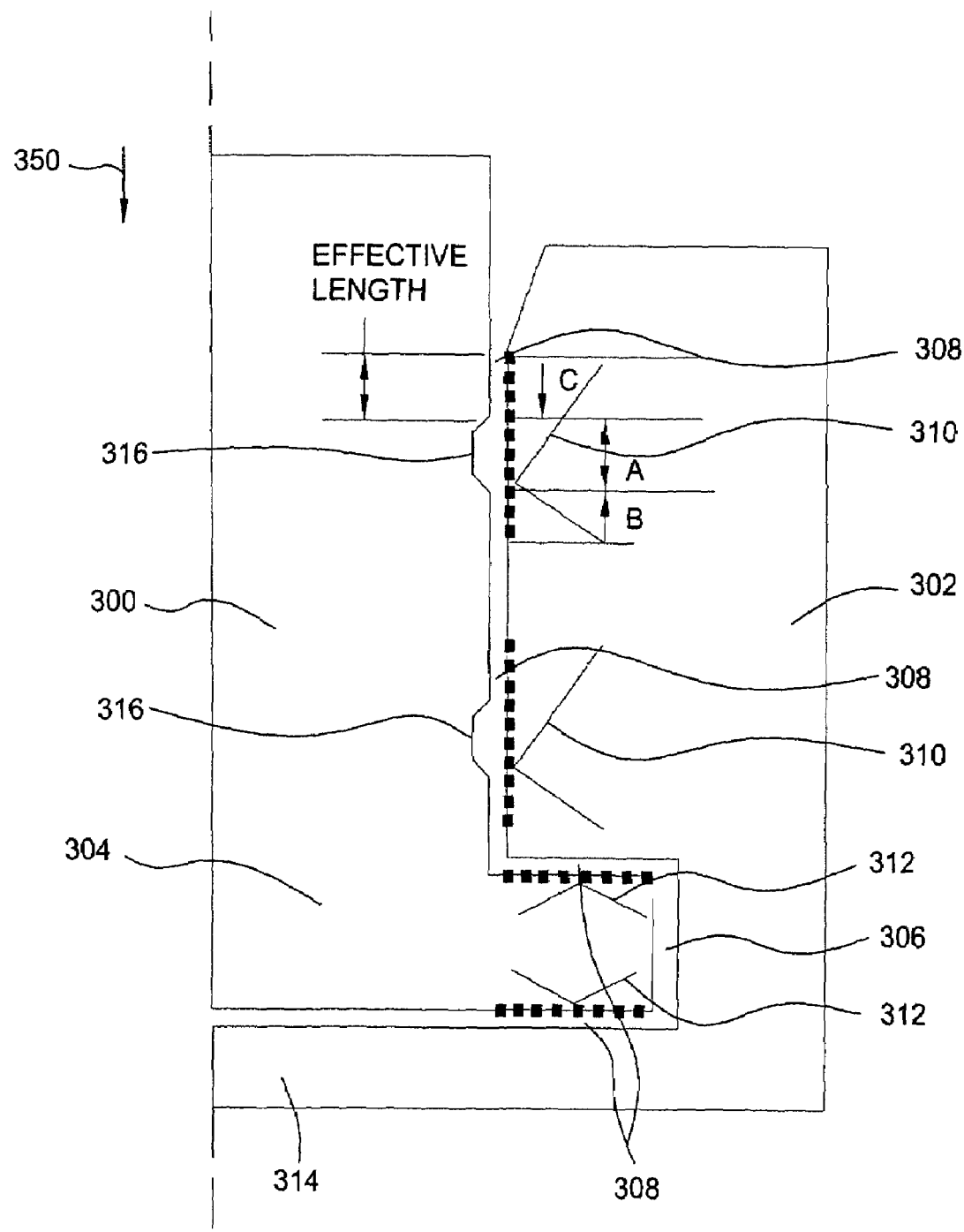
FIG. 3 is a simplified cross-sectional view of the shaft-thrust plate/sleeve junction.

One embodiment of the present invention is shown in FIG. 3. FIG. 3 has a shaft 300, a sleeve 302, a thrust plate region 304 of shaft 300, and a fluid filled gap 306 between shaft 300 and sleeve 302. Four fluid dynamic bearings 308 are shown. Asymmetric journal bearings are shown at 310. Note that one "leg" of the herringbone bearing pattern in the asymmetric journal bearings 310 is longer than the other. Symmetric thrust bearings are shown at 312. A counterplate region 314 of sleeve 302 is shown.

Note that a regulating region in the form of circumferential regulating grooves 316 is located on the shaft surface adjacent to the asymmetrical journal bearing. In the embodiment of FIG. 3, regulating grooves 316 are opposite and slightly offset from the asymmetric journal bearings 310. When the shaft 300 and sleeve 302 are in the proper position, net asymmetry of the system is nominal with a downward pumping direction as indicated by arrow 350. However, if there is axial displacement of the shaft 300, asymmetry is established along the journal bearing(s) to produce a pressure gradient directed toward the thrust bearing. Journal bearing asymmetry produces a hydraulic force to the bottom end of the shaft, producing an upward lift. The effect of the regulating groove is to act in concert with the bearing to move the system back to nominal axial position.

The extent of offset, if any, of regulating groove(s) 316 will depend upon the design of the asymmetric bearing grooves 308. For example, the extent of offset and design of the regulating groove(s) will depend on such factors as the extent of asymmetry of the bearing groove pattern (the differential in "leg" length of the pattern), bearing groove depth, bearing groove width, extent of the grooved area, and/or whether there is a smooth region between legs, etc. The regulating region will vary in diameter (depth of groove or height of step) as necessary to maintain nominal asymmetry given the particular bearing pattern employed.

Pumping directions due to the asymmetric groove and the regulatory region are shown in FIG. 3 as A, B, & C. A indicates the asymmetric bearing region that is disabled or diminished pressure-wise, due to the positioning of the bearing vis-à-vis the regulatory region. In the case of a shallow regulatory groove, A is diminished, with a net downward force. In the case of a deeper regulatory groove, A is disabled, with no net force. B indicates an upward pumping region of the bearing, proportional to the distance from the bottom of the bearing groove to the bottom of the regulatory region. C indicates a downward pumping region of the bearing proportional to the distance from the top of the regulatory region to the top of the bearing groove. Net asymmetry in the case of a shallow regulatory groove 316 would be equal to a function of (A plus C) minus B. Net asymmetry in the case of a deep regulatory groove 316 would be equal to C minus B.

Figure 4:
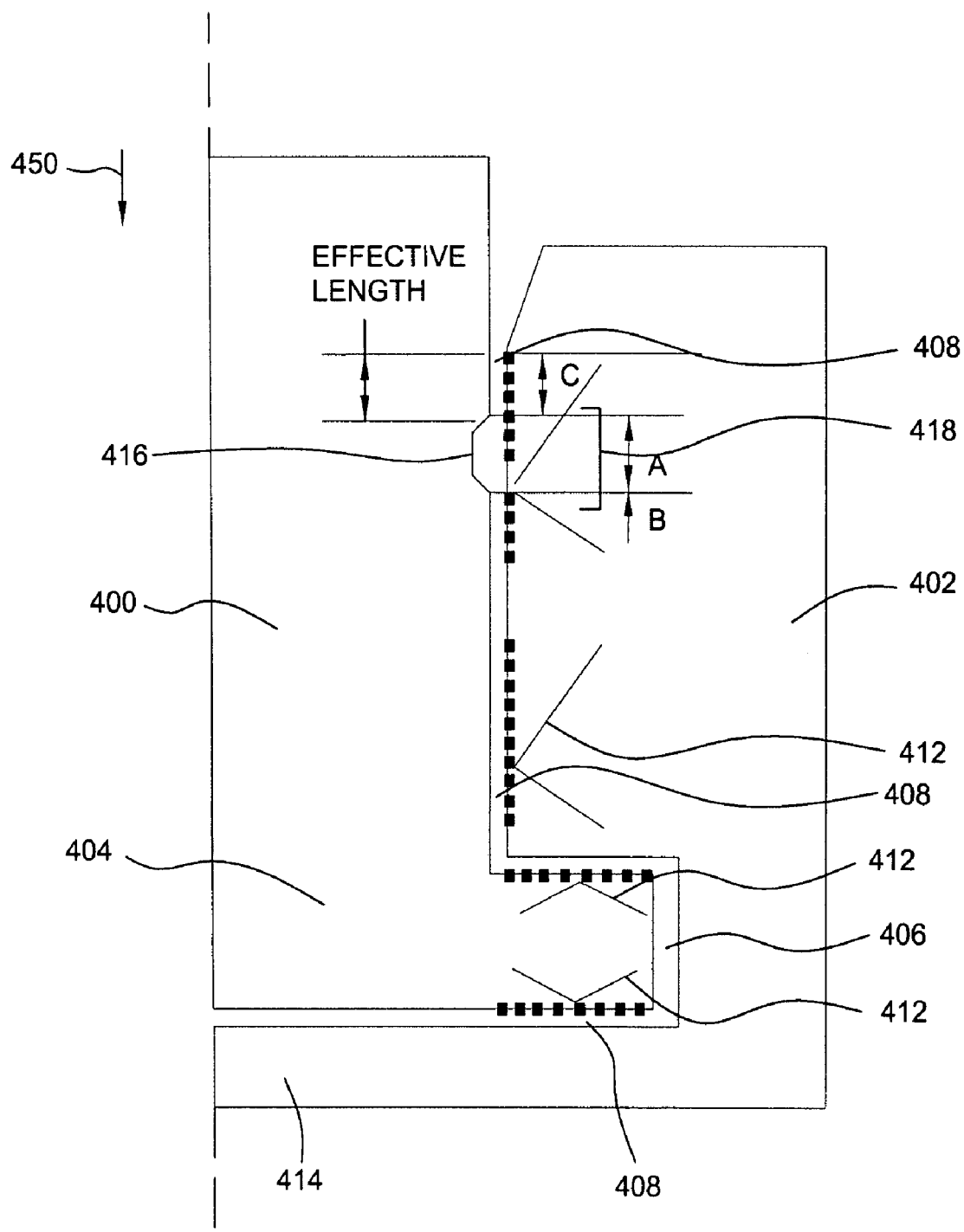
FIG. 4 is a simplified cross-sectional view of the shaft-thrust plate/sleeve junction.

Another embodiment of the present invention is shown in FIG. 4. FIG. 4 shows a shaft 400, a sleeve 402, and thrust plate 404 region of shaft 400, a fluid filled gap 406 between shaft 400 and sleeve 402, and three of the four fluid dynamic bearings (three indicated at 408). Symmetric journal bearings are indicated at 412, and one asymmetric journal bearing is indicated at 418. A counterplate region 414 of sleeve 402 is shown.

In the embodiment shown in FIG. 4, a single regulating region (also a groove-like structure in this embodiment) is present. Again, regulating region 416 is opposite (adjacent) the single asymmetric journal bearing. As in FIG. 3, the asymmetric journal bearing is an asymmetric herringbone pattern. However, in the present embodiment, there is a smooth region between the two legs of the herringbone. Again, when the shaft 400 and sleeve 402 are in proper axial position, asymmetric pressure of the system is nominal (the direction of the nominal asymmetric pressure is shown at 450). However, if there is axial displacement of the shaft 400 relative to sleeve 402, asymmetry is established along the journal bearing(s) to produce a pressure gradient directed toward the thrust bearing. Journal bearing asymmetry produces a hydraulic force to the bottom end of the shaft, producing an upward lift. The effect of the regulating groove is to act in concert with the bearing to move the system back to nominal asymmetry.

In FIG. 4, pumping directions due to the asymmetric groove and the regulatory region are shown as A, B, & C. A indicates the asymmetric bearing region that is disabled or diminished pressure-wise due to the positioning of the bearing vis-à-vis the regulatory region. As in FIG. 3, if the regulatory groove is shallow, the effect of A is merely diminished, and A will have a smaller pumping force downward. If the regulatory groove is deep, the effect of A is disabled or neutralized, and A will have no pumping force. B indicates an upward pumping force, proportional to the distance from the bottom of the bearing groove to the bottom of the regulatory region. C indicates a downward force, proportional to the distance from the top of the regulatory region to the top of the bearing groove. Again as in FIG. 3, net asymmetry in the case of a shallow regulatory groove would be equal to a function of (A plus C) minus B; and net asymmetry in the case of a deep regulatory groove would be equal to C minus B.

Figure 5:
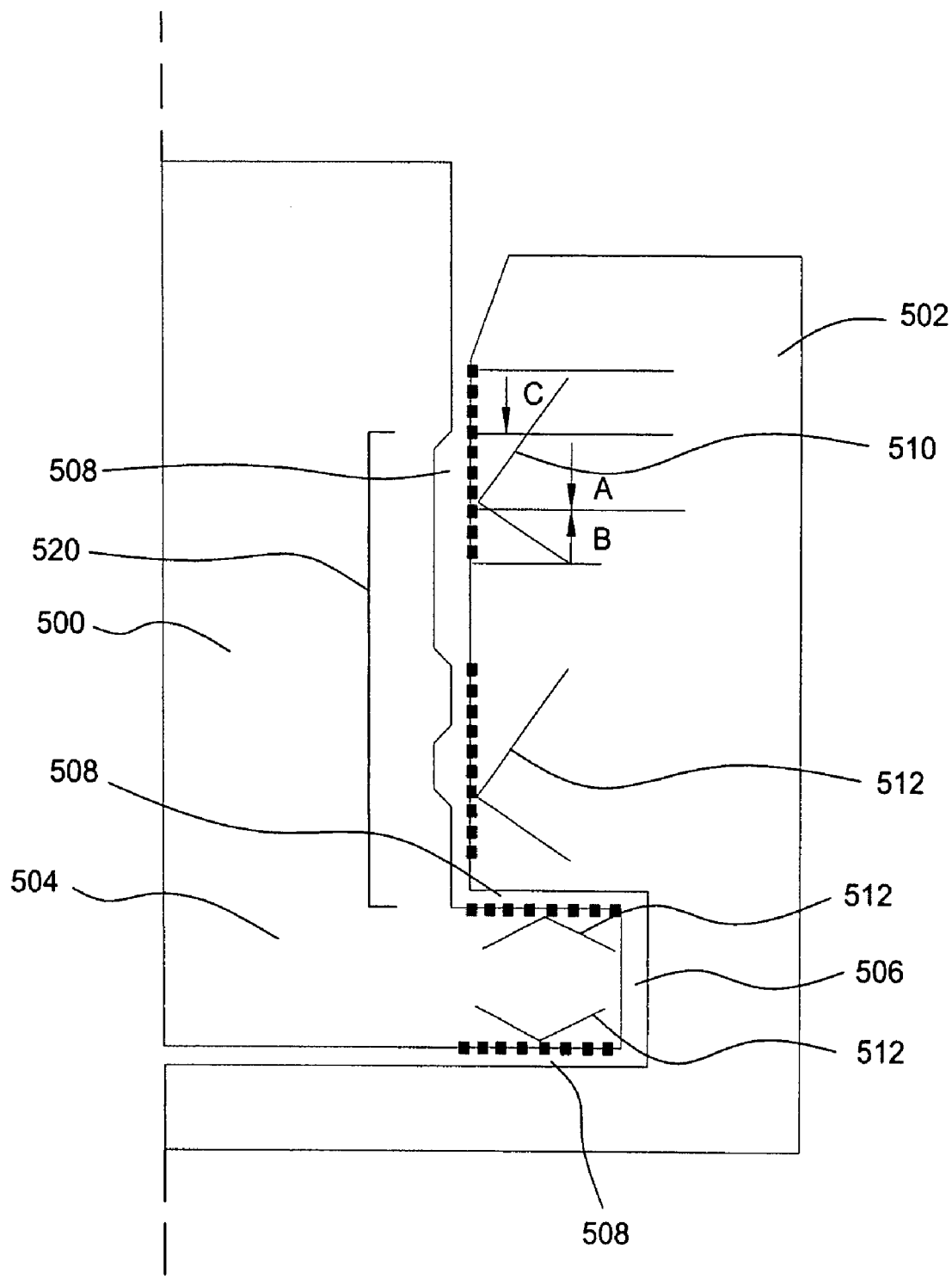
FIG. 5 is a simplified cross-sectional view of the shaft-thrust plate/sleeve junction.

FIG. 5 shows yet another embodiment of the present invention. In the embodiment of FIG. 5, there is a shaft 500, a sleeve 502, a thrust plate region 504 of shaft 500, a fluid filled gap 506 between shaft 500 and sleeve 502, and fluid dynamic bearings 508. Asymmetric journal bearings are shown at 510. Symmetric thrust bearings are shown at 512.

FIG. 5 shows an embodiment where the circumferential regulating region is configured in another way to achieve pressure feedback. Instead of circumferential regulating grooves, FIG. 5 shows a circumferential upraised regulating region with a central "step" 520 disposed upon the surface of the shaft 504. There are many ways in which circumferential grooves or raised regions can be configured to achieve pressure feedback. Those skilled in the art, with the teaching of the present invention, could devise many such embodiments. The regulating grooves, steps or regions must be configured so that the asymmetry of the sleeve/shaft is nominal when in proper axial alignment, and such that the regulatory region provides feedback when relative axial motion occurs.

Pumping directions due to the asymmetric groove and the regulatory region are shown at A, B, & C. A in this embodiment indicates a net downward pumping force proportional to the distance from the herringbone apex to the top of the regulatory region. B indicates the upward pumping force, proportional to the distance of the region from the bottom of the bearing groove to the intersection of the legs of the bearing groove to the top of the regulatory region. C indicates the downward pumping force, proportional to the distance from the top of the regulatory region to the top of the bearing groove. Net asymmetry in this case would be equal to a function of (A plus C) minus B.

In addition, the embodiments shown in FIGS. 3–6 show journal bearings on the sleeve and regulating regions on the shaft. However, it should be apparent that journal bearing patterns could be located on the shaft, and the regulating regions located on the sleeve. In addition, a reduced journal gap size could be introduced in the regulating region (asymmetry region) to heighten the feedback sensitivity to the axial displacement.

Figure 6:
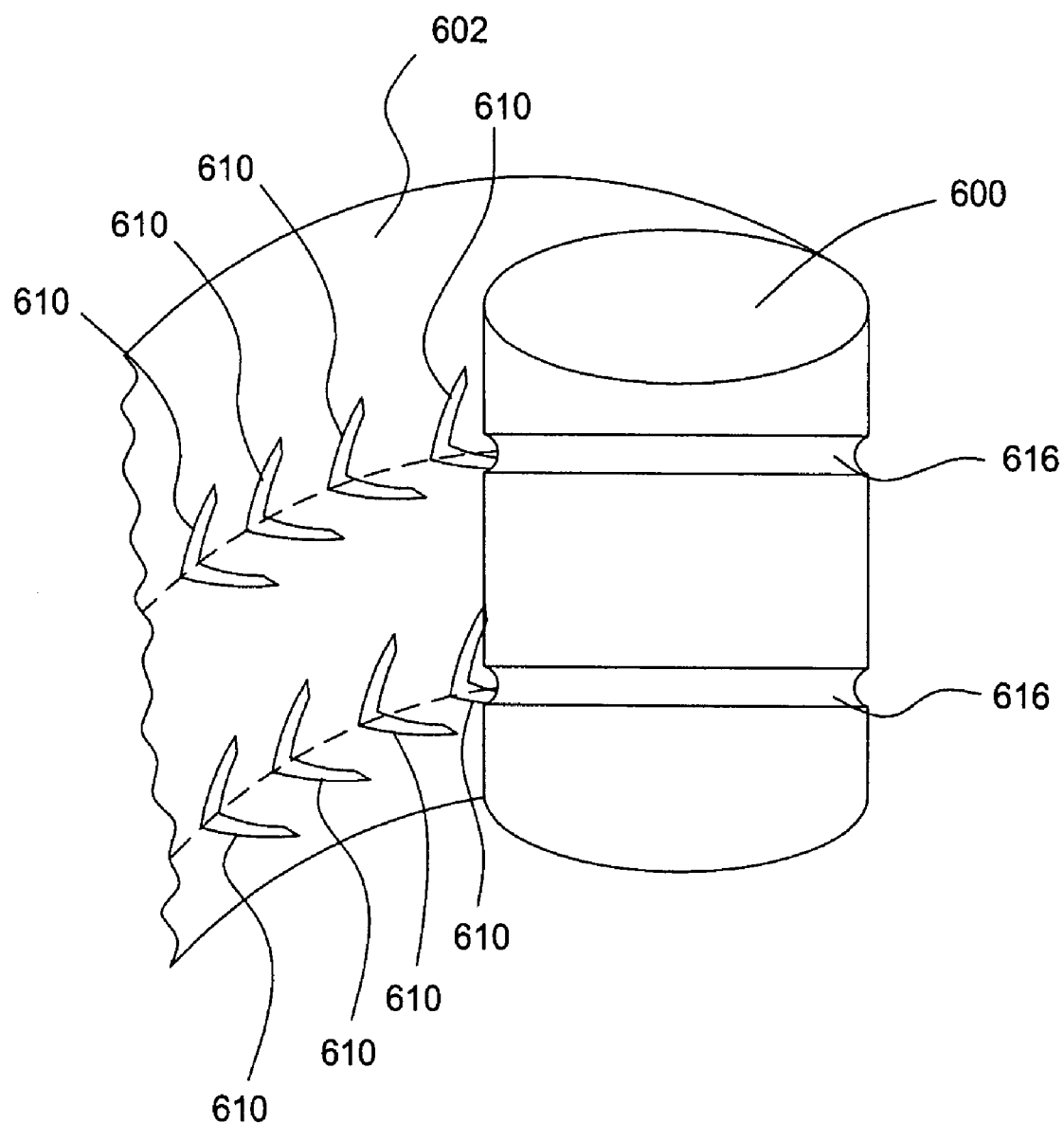
FIG. 6 shows a shaft with regulating grooves, and the wall of the sleeve adjacent the shaft in an "unrolled" configuration with bearing grooves.

FIG. 6 shows an "unwrapped" view of the sleeve 602 around the shaft 600. The shaft 600 has two circumferential regulating grooves 616, opposite two rows of asymmetric journal bearings 610 on sleeve 602. As the shaft rises relative to the sleeve, the regulatory grooves of the shaft cross the apex of the journal grooves on the sleeve, thereby reversing the asymmetry of the pumping direction creating a journal asymmetric pressure feedback system.

Other features and advantages of the invention will become apparent to a person of skill in the art who studies the following disclosure of preferred embodiments.

What is claimed is:

1. A fluid dynamic bearing assembly that provides improved axial alignment and reduced operating thrust gap variation comprising:
   a sleeve having at least one set of asymmetric journal bearing grooves thereon;
   a shaft adjacent the sleeve and having a regulating region facing at least a portion of the asymmetric journal bearing grooves, wherein when the shaft and the sleeve are aligned, the regulating region and the asymmetric journal bearing grooves generate nominal net journal asymmetry pressure and when the shaft and the sleeve are not aligned the regulating region and the asymmetric bearing grooves generate increased journal asymmetry pressure or decreased journal asymmetry pressure.

2. The fluid dynamic bearing assembly of claim 1, wherein the regulating region is a regulating groove or step.

3. The fluid dynamic bearing assembly of claim 2, wherein the regulating groove increases the journal gap such that the pumping action is diminished for the facing portion of the journal bearing grooves.

4. The fluid dynamic bearing assembly of claim 1, wherein there are two sets of asymmetric bearing grooves.

5. The fluid dynamic bearing assembly of claim 1, further comprising at least one set of symmetric journal bearing grooves.

6. A fluid dynamic bearing assembly that provides improved axial alignment and reduced operating thrust gap variation comprising:
   a shaft having at least one set of asymmetric journal bearing grooves thereon;
   a sleeve adjacent the shaft and having a regulating region facing at least a portion of the asymmetric journal bearing grooves, wherein when the sleeve and the shaft are aligned, the regulating region and the asymmetric journal bearing grooves generate nominal net journal asymmetry pressure and when the shaft and the sleeve are not aligned the regulating region and the asymmetric bearing grooves generate increased net journal asymmetry pressure or decreased nominal net journal asymmetry pressure.

7. The fluid dynamic bearing assembly of claim 6, wherein the regulating region is a regulating groove or step.

8. The fluid dynamic bearing assembly of claim 7, wherein the regulating groove or step increases the journal gap such that the pumping action is disabled for the facing portion of the journal bearing grooves.

9. The fluid dynamic bearing assembly of claim 6, wherein there are two sets of asymmetric bearing grooves.

10. The fluid dynamic bearing assembly of claim 6, further comprising at least one set of symmetric bearing grooves.

11. A fluid dynamic bearing assembly comprising:
    a shaft; and
    a sleeve adjacent the shaft; wherein one of the shaft or the sleeve has at least one set of asymmetric journal bearing grooves thereon; wherein the other of the shaft or the sleeve has regulating means facing at least a portion of the asymmetric journal bearing grooves for axially aligning the sleeve with the shaft; and wherein when the sleeve and the shaft are aligned, the regulating means and the asymmetric journal bearing grooves generate nominal net journal asymmetry pressure and when the shaft and the sleeve are not aligned the regulating means and the asymmetric bearing grooves do not generate nominal net journal asymmetry pressure.

12. The fluid dynamic bearing assembly of claim 11, wherein the regulating means is a regulating groove or step.

13. The fluid dynamic bearing assembly of claim 11, wherein the asymmetric bearing grooves are located on the shaft and the regulating means is located on the sleeve.

14. The fluid dynamic bearing assembly of claim 11, wherein there are two sets of asymmetric bearing grooves.

15. The fluid dynamic bearing assembly of claim 11, further comprising at least one set of symmetric bearing grooves.

16. The fluid dynamic bearing assembly of claim 11, wherein the asymmetric bearing grooves are located on the sleeve and the regulating means is located on the shaft.

17. A method for providing axial displacement feedback between a shaft and a sleeve defining a fluid dynamic bearing assembly, comprising;
    providing at least one set of asymmetric bearing grooves on either the shaft or the sleeve; and
    axially aligning the sleeve with the shaft by providing a regulating means facing at least a portion of the asymmetric journal bearing grooves;
    wherein when the sleeve and the shaft are aligned, the regulating means and the asymmetric bearing grooves have nominal net asymmetry and when the shaft and the sleeve are not aligned the regulating means and the asymmetric bearing grooves generate increased or decreased net asymmetry pressure.

18. The method of claim 17, wherein the regulating means is a regulating groove or step.

19. The method of claim 18, wherein the regulating groove or step is opposite and offset from the asymmetric bearing grooves.

* * * * *